United States Patent
Snell

(10) Patent No.: US 9,144,233 B2
(45) Date of Patent: Sep. 29, 2015

(54) CRAWLING PEST CONTROL SYSTEM

(75) Inventor: Eric Snell, Meansville, GA (US)

(73) Assignee: Snell R&D, LLC, Meansville, GA (US)

( * ) Notice: Subject to any disclaimer, the term of this patent is extended or adjusted under 35 U.S.C. 154(b) by 213 days.

(21) Appl. No.: 13/585,975

(22) Filed: Aug. 15, 2012

(65) Prior Publication Data

US 2013/0042520 A1  Feb. 21, 2013

Related U.S. Application Data

(60) Provisional application No. 61/524,348, filed on Aug. 17, 2011.

(51) Int. Cl.
| | | |
|---|---|---|
| *A01M 1/10* | (2006.01) | |
| *A01M 1/18* | (2006.01) | |
| *A01M 1/14* | (2006.01) | |
| *A01M 29/34* | (2011.01) | |
| *A01M 1/20* | (2006.01) | |

(52) U.S. Cl.
CPC ............ *A01M 29/34* (2013.01); *A01M 1/103* (2013.01); *A01M 1/14* (2013.01); *A01M 1/2011* (2013.01); *A01M 2200/011* (2013.01)

(58) Field of Classification Search
CPC .......... A01M 2200/011; A01M 1/103; A01M 2/2011
USPC ............................. 43/123, 121, 114, 107, 131
See application file for complete search history.

(56) References Cited

U.S. PATENT DOCUMENTS

| | | | |
|---|---|---|---|
| 161,032 A | 3/1875 | Hawkins | |
| 168,306 A | 9/1875 | Watkins | |
| 834,518 A | 10/1906 | Grasser | |
| 1,005,567 A | 10/1911 | McDonald | |
| 1,201,720 A | 10/1916 | Haggermann | |
| 1,581,410 A | 4/1926 | Welsh | |
| 1,944,784 A | 1/1934 | Cook | |
| 1,990,049 A | 2/1935 | Perry | |
| 2,210,253 A * | 8/1940 | Neuens | 43/121 |
| 4,263,740 A | 4/1981 | Hemsarth et al. | |
| 4,563,836 A | 1/1986 | Woodruff et al. | |
| 5,048,225 A * | 9/1991 | Brandli | 43/131 |
| 5,090,153 A | 2/1992 | Mullen et al. | |
| 5,155,950 A * | 10/1992 | Burgeson | 43/121 |
| 5,392,559 A * | 2/1995 | Long | 43/121 |
| 5,771,628 A * | 6/1998 | Nobbs | 43/121 |
| 5,926,999 A | 7/1999 | Vernon et al. | |
| 6,145,477 A | 11/2000 | Jansen | |
| 6,158,166 A * | 12/2000 | Snell et al. | 43/131 |
| 6,216,384 B1 | 4/2001 | Dickson et al. | |
| 6,343,434 B1 | 2/2002 | Petti | |

(Continued)

*Primary Examiner* — Darren W Ark
*Assistant Examiner* — Marc Burgess
(74) *Attorney, Agent, or Firm* — Kim Winston LLP

(57) ABSTRACT

A pest control system for bed bugs or similar crawling pests. The system includes at least one intercept wall extending generally perpendicularly to the plane on which the pests are traveling for directing the pests to interact with a trap or a treatment zone. The effect of the intercept wall may be enhanced by provision of at least one substantially smooth guide surface positioned adjacent the intercept wall. When pests come into contact with a smooth surface they experience difficulty in traversing it. This causes the bugs to cling to the more textured surface that they are already traversing. The intercept wall is preferably placed in the direct path of the transition line between the textured surface and the smoother guide surfaces and forces the pests to interact with an adjacent trap or treatment zone.

29 Claims, 6 Drawing Sheets

(56) References Cited

U.S. PATENT DOCUMENTS

| | | |
|---|---|---|
| 6,510,648 B2 * | 1/2003 | Roberts .......................... 43/109 |
| 7,165,353 B2 | 1/2007 | Matts et al. |
| 7,591,099 B2 | 9/2009 | Lang et al. |
| D639,895 S | 6/2011 | Schneidmiller et al. |
| 2002/0112396 A1 * | 8/2002 | Nyberg ........................... 43/121 |
| 2003/0145511 A1 | 8/2003 | Finn et al. |
| 2005/0000147 A1 * | 1/2005 | Westphal et al. ............... 43/131 |
| 2009/0145019 A1 * | 6/2009 | Nolen et al. .................... 43/121 |
| 2009/0223115 A1 | 9/2009 | Lang et al. |
| 2009/0282728 A1 * | 11/2009 | McKnight et al. ............. 43/109 |
| 2010/0043275 A1 | 2/2010 | Battick |
| 2010/0308194 A1 | 12/2010 | Pal, Jr. |
| 2011/0041385 A1 | 2/2011 | Faham et al. |
| 2011/0047860 A1 * | 3/2011 | Black et al. .................... 43/123 |
| 2011/0099886 A1 | 5/2011 | Siljander et al. |
| 2011/0107654 A1 | 5/2011 | Wieler |
| 2011/0289822 A1 | 12/2011 | Duehl et al. |
| 2012/0060406 A1 | 3/2012 | Schneidmiller et al. |
| 2012/0096759 A1 | 4/2012 | Biggs |
| 2012/0110894 A1 | 5/2012 | Black et al. |

\* cited by examiner

CRAWLING PEST CONTROL SYSTEM

CROSS REFERENCE TO RELATED APPLICATION

This application claims the benefit of U.S. Provisional Application No. 61/524,348, filed Aug. 17, 2011, the disclosure of which is incorporated herein in its entirety by reference thereto.

FIELD OF THE INVENTION

The present invention relates in general to crawling pest control systems and, in particular, to devices and methods for capturing or treating crawling insect pests such bed bugs and the like.

BACKGROUND OF THE INVENTION

Bed bug control has become increasingly difficult while the prevalence of the species in homes, hotels/motels and other businesses has simultaneously reached crisis levels. The concept of trapping bed bugs and other crawling insects is presently generally regarded as a way of early detection and monitoring of the pests. Currently, however, it is not suitable for controlling and remediating existing problems.

An advantage exists, therefore, for traps that can inhibit and possibly prevent bed bug and other crawling insect infestation by intercepting the pests as they are newly introduced into an environment in order to prevent their feeding and subsequent egg laying.

A further advantage exists for traps suitable for detecting low levels of pest populations following pesticide treatment as a means to confirm that the population has been effectively eliminated.

A further advantage exists for traps that can be used to detect locations of isolated populations of crawling pests to pinpoint particular treatment needs for reducing the pest population.

SUMMARY OF THE INVENTION

The present invention provides pest control systems that incorporate interception means to impede the forward movement of bed bugs or similar pests and cause them to interact with trapping means or treatment means. When bed bugs or similar pests move along a surface (on any plane) their movement can be slowed or deterred when they encounter an intercept wall or surface extending generally perpendicularly to the plane on which they are traveling. The effect of the intercept wall may be further enhanced by use of a substantially smooth guide surfaces. Guide surfaces can be created by means of substantially smooth means such as smooth tape or smooth surfaces joined to a trapping or treatment device. When bed bugs or other crawling pests come into contact with a smooth surface, they either cannot traverse it or will experience difficulty in doing so. This causes the pests to follow the path of least resistance and cling to the more textured surface that they are already traversing. The intercept wall according to the invention is preferably placed in the direct path of the transition line between the roughened or textured surface and the smoother guide surface(s) and forces the pests to interact with a trap or treatment zone that is placed on or near the intercept wall. Thus, the intercept wall provides a means to improve the likelihood that the bed bugs interact with the trapping or treatment device. Without such an intercept wall, most bed bugs and like pests can easily walk past a pest control device without interacting with it.

The systems and methods according to the invention function to guide bed bugs from a large area into a confined treatment or trapping device, with or without the use of attractants such as $CO_2$, heat, pheromones and/or kairomones.

Non-limiting uses for the instant technology include:
1. A trapping device—using an intercept wall to guide bugs into a trapping means
2. A treatment device—using an intercept wall to guide bugs into a treatment zone
3. A prevention/monitoring device—using guide surface(s) in conjunction with an intercept wall and trapping device to block bugs from accessing a protected location such as a bed or table and to monitor for new bed bugs in the area
4. A bed leg protector in combination with tape—wrapping tape around the legs of a bed, chair or table to prevent bugs from climbing onto the protected furniture, while guiding the bugs into a trapping or treatment means when they are blocked by an intercept wall
5. A bed leg protector in combination with a blocking device—a physical device that is placed under or around the legs and frames of furniture to prevent bed bugs from accessing the furniture while incorporating an intercept wall to guide the bugs into a trapping or treatment means The disclosed invention also provides for point source pesticide treatments to be placed in the direct path of bed bugs or similar pests. Through the disclosed methods of guide surfaces and interception walls, bed bugs and like pests that are foraging over a large area can be funneled into a small space that is treated with a contact pesticide so that very small amounts of pesticides can be used to treat bed bugs over a very large area.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1A:
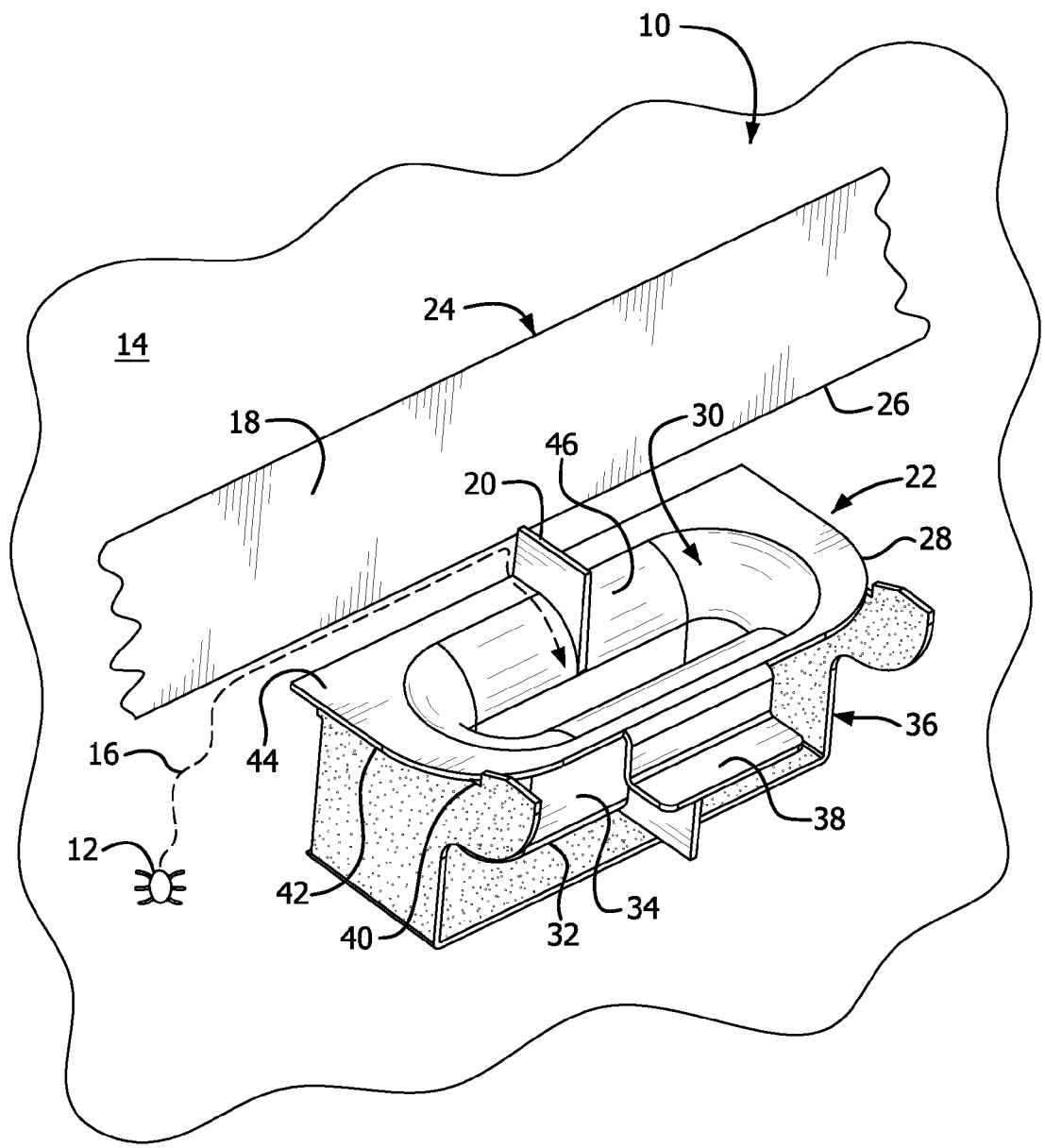
FIG. 1A is a top perspective of view of a first embodiment of a pest control system according to the present invention.

The following definitions and discussion of general principles are offered to provide context for the subsequent detailed description of preferred embodiments of the invention.

As used herein, "substantially smooth surfaces" or words of similar effect shall mean surfaces that, when placed vertically, substantially vertically or facing downwardly, bed bugs or similar crawling pests cannot traverse. Bed bugs and like pests can walk across the smoothest surfaces when placed substantially horizontally, however they will not generally cling to such surfaces (regardless of their orientation). Thus, when given the choice between smooth or textured surfaces, even when placed horizontally, crawling pests will choose to follow the textured surface.

As used herein, "substantially inclined", "substantially vertical" or words of similar effect shall mean sloped at a steep incline to an essentially vertical orientation. The greater the incline, the more difficulty bed bugs have climbing upwardly. Most surfaces, including glass, can allow bed bugs and similar pests to climb upwardly on an angle of a few degrees. However, depending on the life stage of the bug and the smoothness of the surface, increasing the angle of the incline will eventually make it impossible for the pest to traverse to the top of the surface.

As used herein, "guide surface" or words of similar effect shall mean a substantially smooth surface fabricated as part of a larger trap or as a separate element placed in the a bed bug's or similar pest's environment. The smoothness of the guide surface substantially impedes bugs from crossing the surface and causes them to stay on their preferred textured climbing surface, thus following the edge of the guide surface. Such guide surfaces can be used as a means of guiding the bugs toward a trap location or a treatment location. Guide surfaces may include, without limitation, tape or strips of plastic having a smooth exterior surface which may be attached to substrates such as walls, furniture, bed legs, and bed frames to both protect a bed and guide the bugs to a trap or treatment zone.

As used herein, "transition line" or words of similar effect shall mean the edge of a guide surface or similar smooth surface. The transition line is the border between a textured surface that bed bugs or similar pests can comfortably and freely move on and a smooth surface that impedes their movement. The transition line guides the bugs to move alongside the guide surface as they traverse a textured surface.

As used herein, "intercept wall" or words of similar effect shall mean a substantially smooth wall or barrier placed substantially perpendicular to the path of movement of a bed bug or similar pest. An intercept wall at least partially impedes the bug's motion and operates as a means of increasing the likelihood of the bug's interaction with a trap or treatment zone. An intercept wall is ideally placed along the transition line of a guide surface so that bugs are intercepted as they follow the textured surface and are impeded from continuing further along the transition line. Once the bugs contact the intercept wall, they are redirected along the wall to contact a trap, treatment zone, or other type of control or monitoring device.

As used herein, "trap", "trapping means" or words of similar effect shall mean a device or other means located adjacent to or connected to an intercept wall by which bed bugs or similar pests are trapped as they navigate around the intercept wall. The trapping means can be glue, a pitfall, or other means of immobilizing or capturing the bugs.

As used herein, "treatment zone", "treatment means" or words of similar effect shall mean a pesticide treated space located adjacent to or connected to an intercept wall and over which the bed bugs or similar pests pass whereby the bugs are exposed to the pesticide as they navigate around the intercept wall. The treatment zone combined with the intercept wall provides a means of applying very small amounts of pesticides while treating pests harvested from a much larger foraging area. Once bugs are exposed to the pesticide they either die or carry the residual pesticide back to other bugs at their harborages.

As used herein, "pest control means", "bed bug control means" or words of similar effect shall mean a trapping means and/or a treatment means.

With the foregoing in mind, referring to the drawings wherein like or similar references indicate like or similar elements throughout the several views, there is shown in FIG. 1A a first embodiment of a pest control system according to the present invention, identified generally by reference numeral 10. System 10 comprises several elements, discussed below, which cooperate to control the path of movement of bed bugs or similar crawling pests (one of which is identified by reference numeral 12) through the use of tactile cues that capitalize on the behavior of such bugs and influence their motion accordingly.

As depicted in FIG. 1A, a bug 12 such as a bed bug or similar crawling pest is shown traversing a substantially vertical substrate 14 such as a wall, a bed platform or a piece of furniture, wherein the bug's path of travel is indicated by dashed line 16. During its travels the bug encounters system 10, which system comprises at least one guide surface 18, at least one intercept wall 20 and a pest control means 22. As described and illustrated herein, the at least one intercept wall is represented as being a component of the pest control means. However, it is contemplated that the intercept wall(s) may be components of the guide surface(s) 18 or independent members that may be attached to either or both the guide surface(s) 18 or the pest control means 22.

According to the embodiment of the invention shown in FIG. 1A, the at least one guide surface 18 is the smooth exposed or outer surface of a strip of adhesive tape 24. When the bug encounters the bottom edge 26 of the tape, i.e., the transition line between the smooth tape surface and the roughened surface over which it is travelling (e.g., drywall or wood grain) it detects the smooth tape surface and, sensing that it cannot gain traction, begins to travel along the tape edge/transition line 26 toward the intercept wall 20. While only one intercept wall is shown in FIG. 1A, there may be more, as discussed below. An advantage of using adhesive tape as guide surface(s) is that it is entirely user-selectable in length and can draw in bed bugs and other pests to pest control means 22 from long distances, e.g., from 10 to 30 feet or even more or less as may be required for particular circumstances.

Alternatively, while described above as being the exposed or outer surface of flexible adhesive tape, it will be understood that guide surface 18 may be the smooth outer surface of a strip of plastic or even glass that may be affixed, either fixedly or releasably, to substrate 14 by any suitable means such as epoxy adhesive, tack adhesive or mechanical fasteners such as screws, nails or the like (either with or without additional anchor means).

Preferably, intercept wall 20 extends substantially perpendicular to the plane of the substrate on which the bug is travelling which, in the present example, is a substantially vertical wall, bed platform or furniture surface 14. In the present case, while substantially orthogonal or perpendicular to surface 14, intercept wall 20 also preferably extends substantially vertically. Following the bottom edge 26 of tape 24, the bug eventually meets with the intercept wall 20, which itself is preferably a substantially smooth surface whereby the bug's motion is impeded. Upon encountering the intercept wall, therefore, the bug is redirected toward a pest treatment zone and/or trap as described below.

As seen in FIG. 1A, pest control means 22 comprises a receptacle 28 having an open top 30 and a closed bottom 32 joined by preferably substantially vertical side walls 34. A bracket 36 supports the receptacle against the substrate 14 and guide surface 18. The bracket may be permanently affixed to the substrate such as by epoxy adhesive, but is preferably releasably connected to the substrate by releasable mechanical fastening means such as, for example, tacky adhesive means (such as double-sided adhesive tape), nails or screws (either with or without additional anchor means).

The receptacle 28 desirably includes a handle 38 and is removably connectable to bracket 36 via a shoulder or similar structure 40 upon which rests a lower surface 42 of an upper flange 44 of receptacle 28. In the embodiment of the invention shown in FIG. 1A, intercept wall 20 is carried by receptacle 28 and at least slightly overlaps the bottom edge 26 of guide surface 18. In this way, intercept wall acts as an effective barrier for redirecting pests' motion toward the pest control means 22.

As seen in FIG. 1A and other figures the receptacle is a pitfall into which bed bugs or other pests fall when redirected toward the receptacle. As noted hereinabove, it has been observed that bed bugs and similar pests are sensitive to abrupt changes in surface textures (e.g., from rough to smooth) and surface orientations (e.g., from one spatial plane to another). Because of these characteristic tactile responses to changes in terrain, it is desirable that the receptacle include a gradually curved transition zone between the open top 30 and closed bottom 32. In the absence of such a transition zone there would a creased line across which a bed bug might sense a change in surface planarity, which could be as precipitous as 90° or more. In that event the bug may opt not to cross the line, whereby it would not fall into the pitfall. In contrast, a gradually curved convex transition zone is less likely to be detected as a change in planarity. Consequently, the bug would feel comfortable in traversing the curve until it reaches a point beyond which it cannot not cling to the surface and would drop into the pitfall.

According to a preferred embodiment, the transition zone is constructed as at least one convex surface 46 extending between at least the open top 30 to the side walls 34, and possibly to the closed bottom 32. At least the innermost/lowermost portions of the convex surface are desirably substantially smooth in order to increase the likelihood that the bug eventually loses traction and falls into the pitfall. Likewise, the side walls 34 are desirably substantially vertical and their inner surfaces are preferably substantially smooth in order to assure that the trapped bug cannot escape the pitfall once it has fallen into it.

Figure 1B:
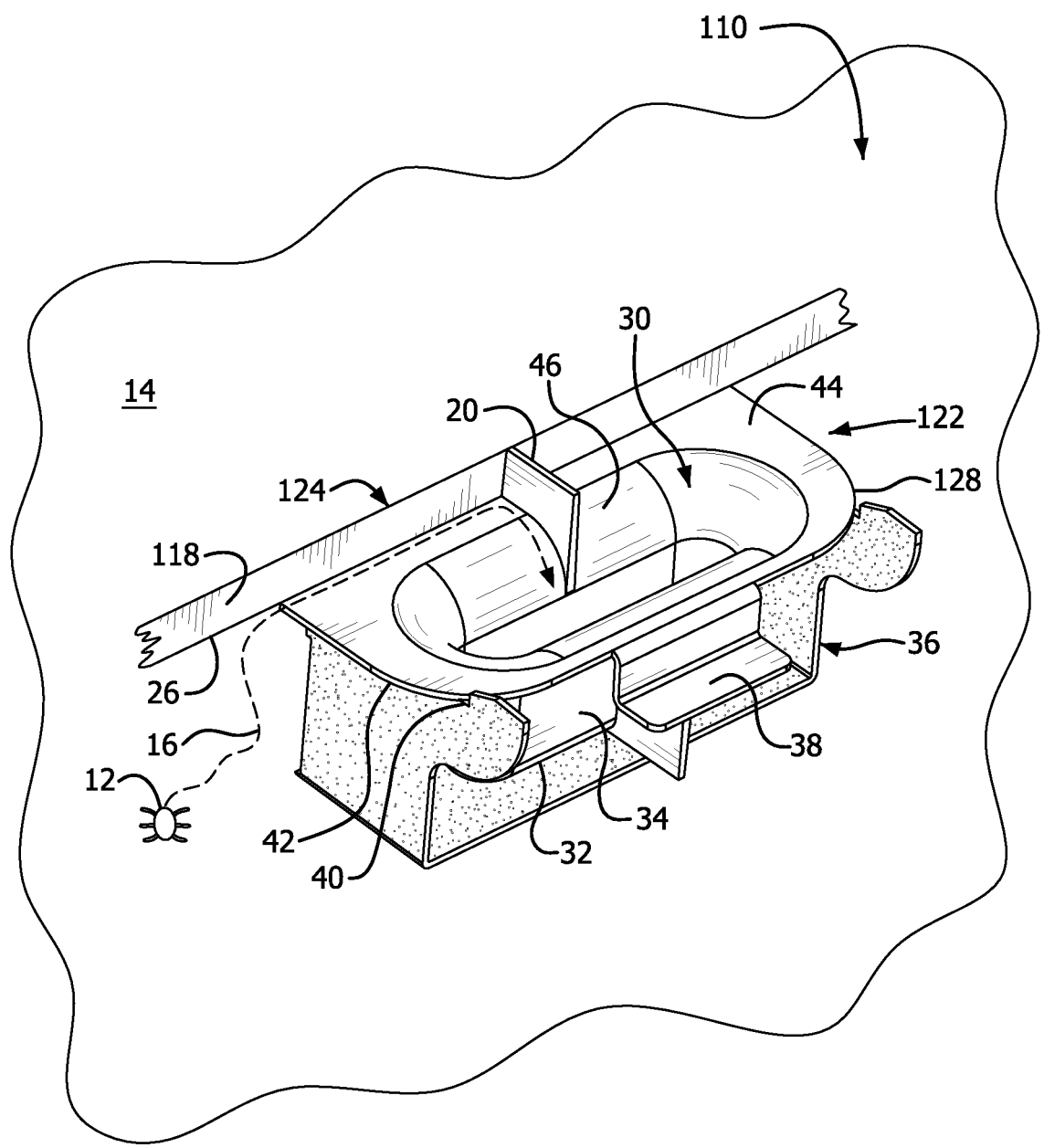
FIG. 1B is a top perspective of view of a further embodiment of a pest control system according to the present invention.

FIG. 1B reveals an alternative embodiment of a pest control system according to the present invention which is identified generally by reference numeral 110. In many respects, pest control system 110 is very similar to pest control system 10 described above. Accordingly, only those features that depart materially in structure and/or function from their counterparts in FIG. 1A or are otherwise necessary for a proper understanding of the invention will be described in detail in connection with FIG. 1B.

As seen in FIG. 1B, a pest control means 122 includes a receptacle 128 which is integrally joined with a substantially smooth guide surface 118. According to the construction shown in FIG. 1B, guide surface 118 is an elongate strip of flexible to rigid plastic 124 that may be permanently affixed to the substrate 14 such as by epoxy adhesive, but is preferably releasably connected to the substrate by releasable mechanical fastening means such as, for example, tacky adhesive means (such as double-sided adhesive tape), nails or screws (either with or without additional anchor means). As seen by the path of travel 16 of pest 12 shown in FIG. 1B, it will be appreciated that the pest control system 110 illustrated in that figure performs substantially similarly to that of system 10 described above in connection with FIG. 1A.

Figure 2A:
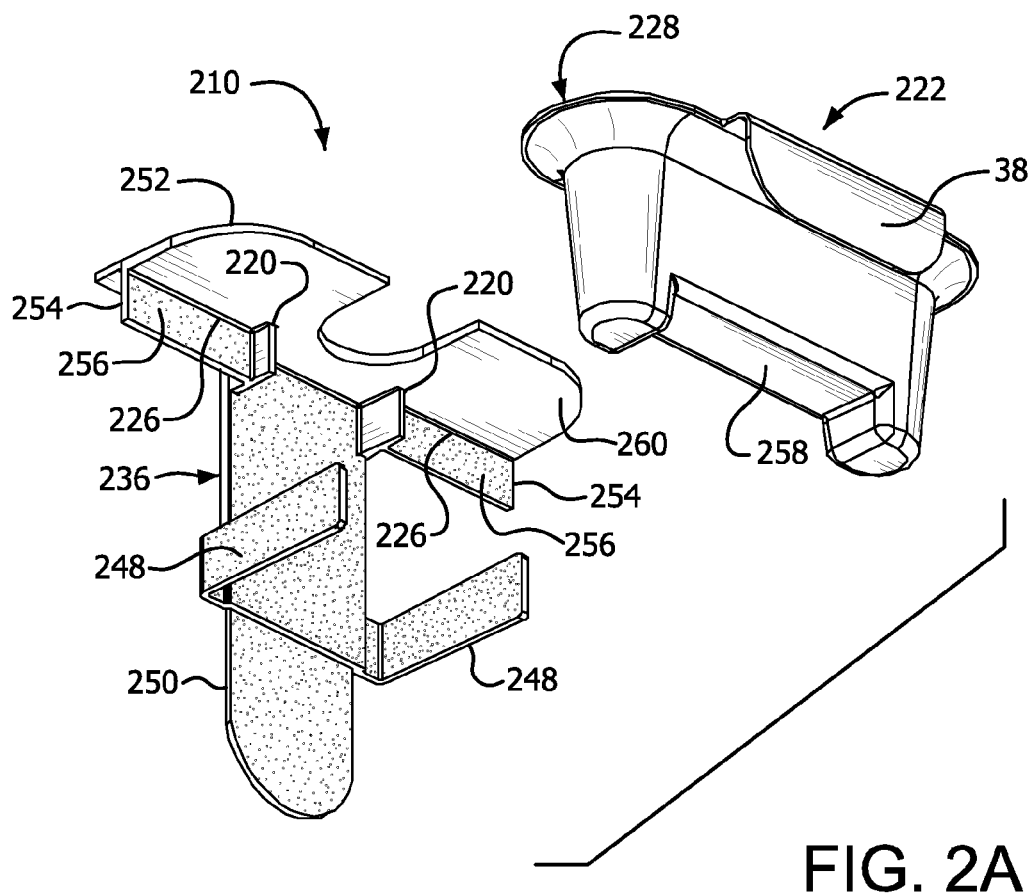
FIG. 2A is a bottom perspective view of a bracket and receptacle of a pest control system according to the present invention in disassembled condition.
Figure 2B:
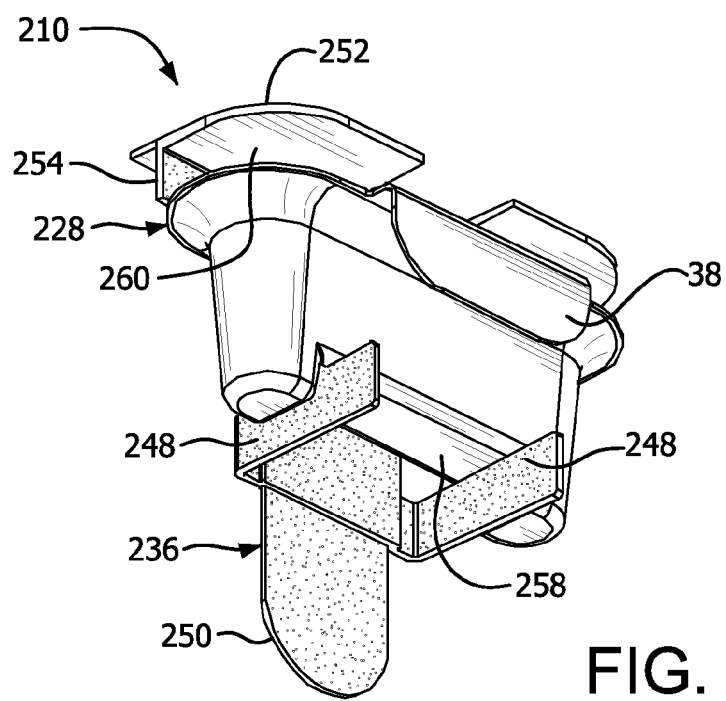
FIG. 2B is a bottom perspective view of the bracket and receptacle of FIG. 2A in assembled condition.

Referring to FIGS. 2A and 2B there is illustrated a further embodiment of a pest control system 210 pursuant to the present invention. As seen in FIGS. 2A and 2B, system 210 comprises a bracket 236 and a pest control means 222 including a pitfall type receptacle 228. Similar to the receptacles described above, receptacle 228 preferably includes a handle 38 to facilitate its insertion into and removal from bracket 236. Bracket 236 may be permanently or releasably secured to a substrate in the manners discussed above. Bracket 236 preferably includes at least one cantilevered arm 248 extending substantially perpendicularly from a back plate 250, an upper flange 252, and a pair of walls 254 having forwardly facing surfaces 256 in communication with a pair of intercept walls 220. As shown in FIG. 2B, the at least one arm 248 is adapted to support the receptacle 228 by engaging at least one notch 258 provided in the bottom of the receptacle when the pest control system 210 is in assembled condition.

In order to promote proper guidance of pests toward the open top of receptacle 228 (which open top is not shown in FIGS. 2A and 2B) it is preferred that most exposed surfaces of the bracket 236 be substantially roughened or textured. A notable exception would be the underside 260 of flange 252 which is preferably substantially smooth in order to establish a transition line 226 between it and the surfaces 256 of walls 254. Moreover, the height of the intercept walls 220 is desirably sufficient to result in contact between the lower edges of the intercept walls and the upper surface of the receptacle 228 for two reasons: (1) it provides a snug fit between the receptacle and the bracket to prevent misalignment of the receptacle relative to the bracket, and (2) bed bugs and similar pests are more likely to be properly diverted toward the open top of the receptacle when they cannot escape under the lower edges of the intercept walls.

Figure 3A:
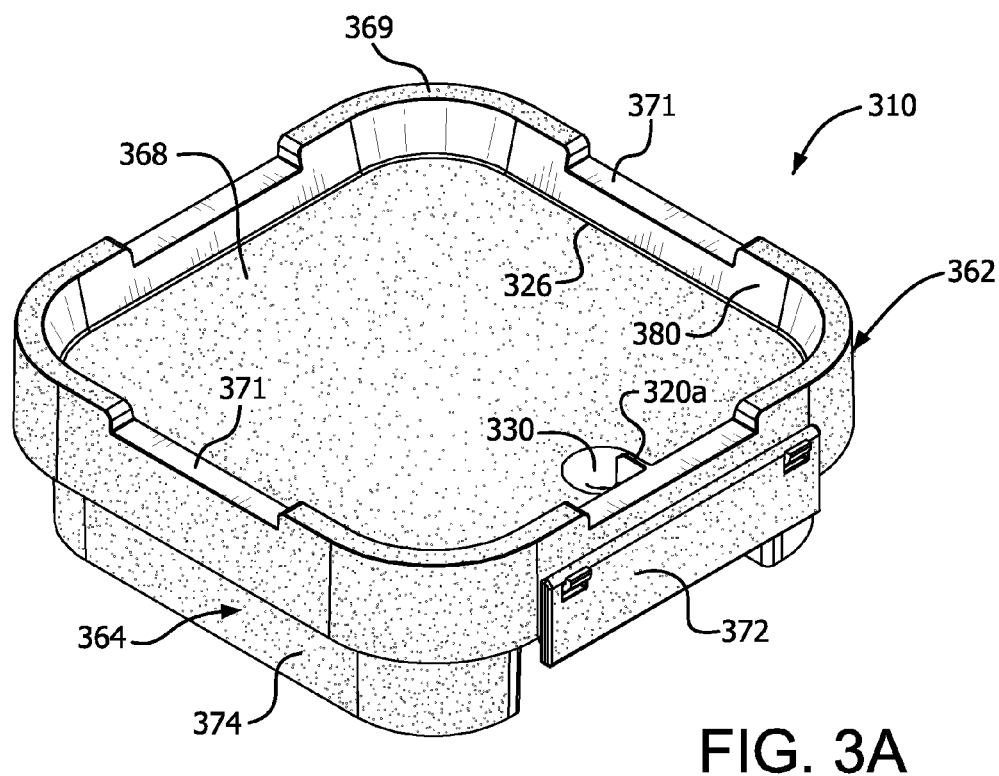
FIG. 3A is a top perspective view of a further embodiment of a pest control system according to the present invention in assembled condition.
Figure 3B:
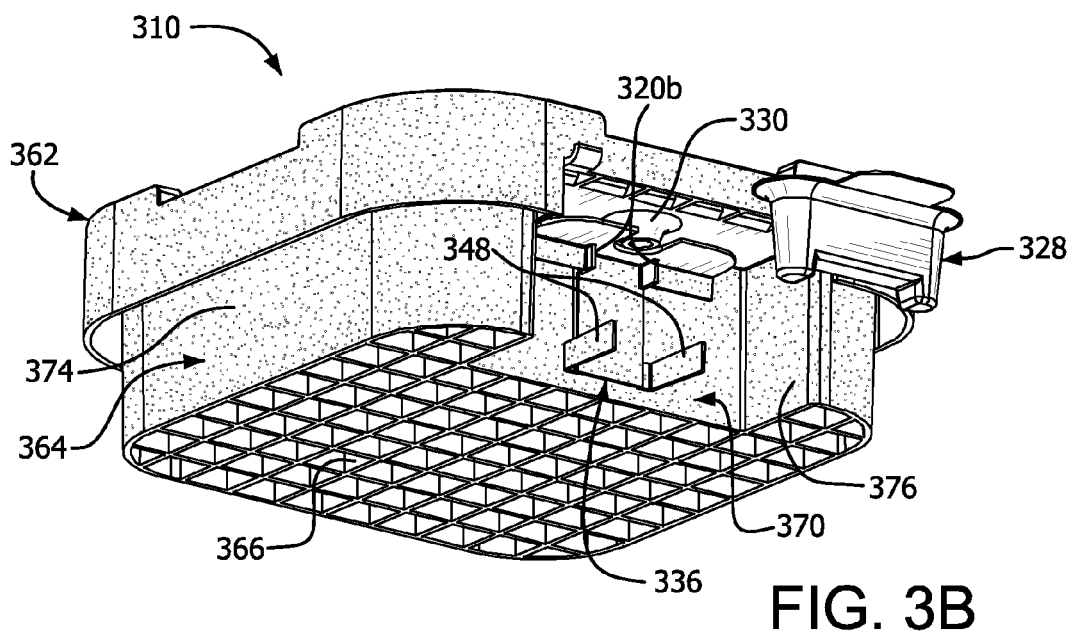
FIG. 3B is a bottom perspective view of the pest control system of FIG. 3A in disassembled condition.
Figure 3C:
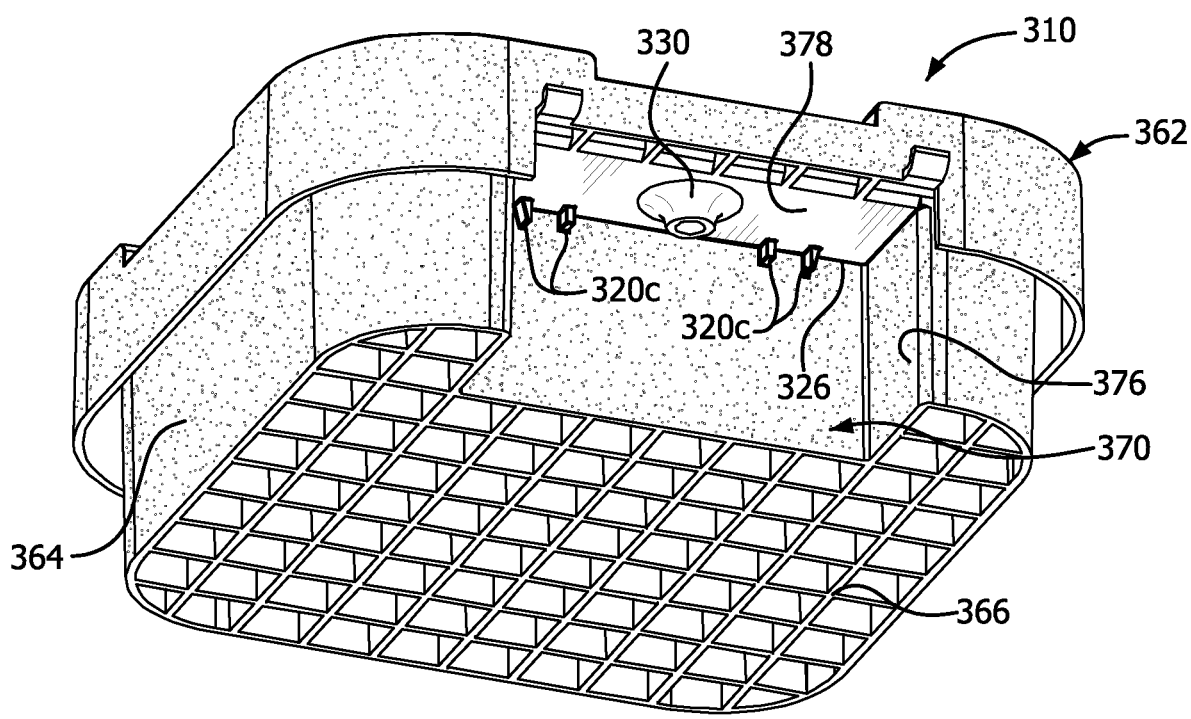
FIG. 3C is a bottom perspective view of the pest control system of FIG. 3A with certain elements omitted for clarity of illustration.

Referring to FIGS. 3A-3C, there is shown a further embodiment of a pest control system according to the invention, identified generally by reference numeral 310. System 310 represents an example of a bed protection device in which an unillustrated bed leg or frame rests atop a base 362. As seen in FIGS. 3B and 3C a platform portion 364 of base 362 is preferably molded with grid-like structural reinforcement 366 which enhances the base's ability to support the weight of the bed, which can be considerable under certain circumstances, e.g., a waterbed or a bed upon which heavy persons might routinely rest. Further, although shown as being generally square in peripheral shape, it will be understood that the outer periphery of the base 362 may assume any shape suitable to achieve the objectives of the present invention. In order to stabilize a bed when supported thereby, base 362 is preferably provided with an upper recessed region 368 (FIG. 3A) which is adapted to receive the bottom of a bed leg. In addition, the top edge 369 of base 362 is also preferably formed with a plurality of notches 371 for receiving the bottom edges of a box frame to provide stability to box frame beds and prevent them from slipping from the base during use.

In contrast to the embodiments of the invention thus far disclosed, the system represented in FIGS. 3A-3C includes a plurality of sets of intercept walls. In specific, a single intercept wall 320a (FIG. 3A) is provided in upper recessed region 368. And, at least one set of intercept walls 320b is located in a lateral cove 370 (FIGS. 3B and 3C) provided in platform 364. More specifically, as seen in FIG. 3B, a bracket 336 constructed substantially similarly to bracket 236 of FIGS. 2A and 2B may fitted within the cove and releasably or permanently connected thereto by any of the affixation means described hereinabove. Bracket 336 includes intercept walls 320b which are constructed substantially similar to and function substantially the same as intercept walls 220 of bracket 236 discussed above. And, like bracket 236, bracket 336 is operable to removably receive a pitfall type receptacle, identified by reference numeral 328, having a construction substantially similar to the pitfall traps described above. Moreover, bracket 336 need not be a separate part in relation to base 362. That is, the essential features of the bracket, i.e., the receptacle support arms 348 and intercept walls 320b, may be molded directly into base 362 upon manufacture of system 310.

FIG. 3C reveals that cove 370 may be provided with additional intercept walls 320c to further enhance the likelihood of bed bugs and similar pests falling into receptacle 328. In addition, as seen in FIG. 3A, for aesthetic purposes base 362 is preferably provided with a pivoting door 372 which may be lifted when it is desired to insert and remove the receptacle from the cove.

As seen in FIGS. 3A-3C, the upper recessed region 368 of base 362 is desirably provided with a generally funnel-shaped opening 330 through which bed bugs or similar pests fall into receptacle 328. Opening 330 preferably has a continuous convex radius similar to the at least one convex surface 46 discussed hereabove in connection with FIG. 1A. The outer walls 374 of platform 364, the walls 376 of cove 370 and the surface of upper recessed region 368 are preferably textured or roughened to promote movement of bed bugs therealong. However, the "ceiling" 378 of the cove (FIG. 3C) and the inner walls 380 of the recessed region 368 are preferably substantially smooth so as to establish transition lines 326 along which bugs travel before encountering intercept walls 320a, 320b and/or 320c and passing through the opening 330 (which is in alignment with receptacle 328) or directly into the receptacle, as the case may be. That is to say, bugs that are already on an infested bed and traveling downwardly along the bed leg or box frame will eventually encounter the upper transition line 326 and follow that line until they hit intercept wall 320a whereupon they fall through funnel 330 and into the pitfall receptacle 328. Conversely, bugs that are on the floor will climb up the textured sides of platform 364, then travel along the transition line 326 at the interface of the textured surfaces and smooth ceiling surface 378, then hit the intercept walls 320c or 320b, and fall directly into the pitfall receptacle 328.

Figure 4A:
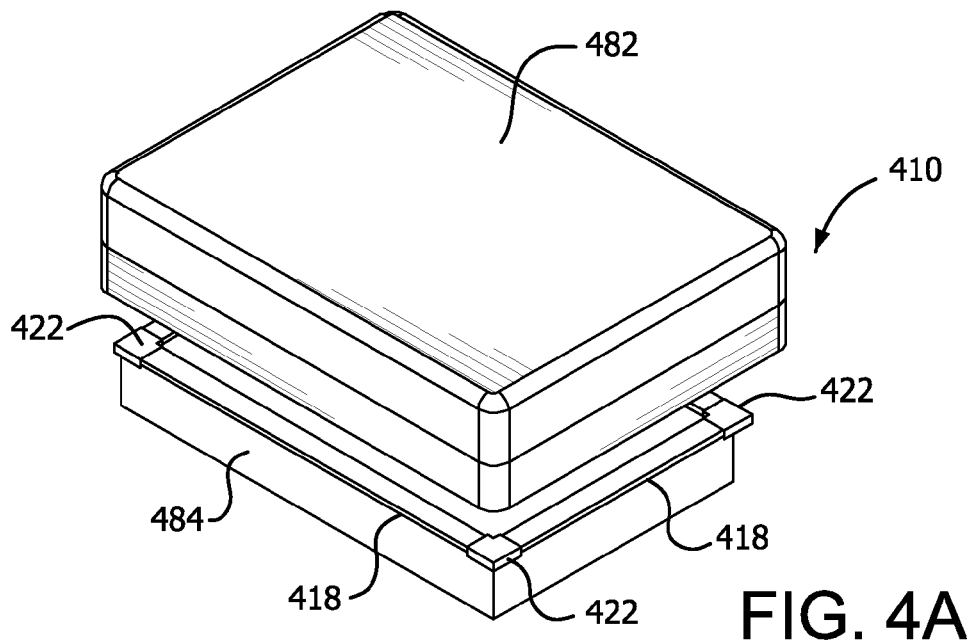
FIG. 4A is a top perspective view of a further embodiment of a pest control system according to the present invention.
Figure 4B:
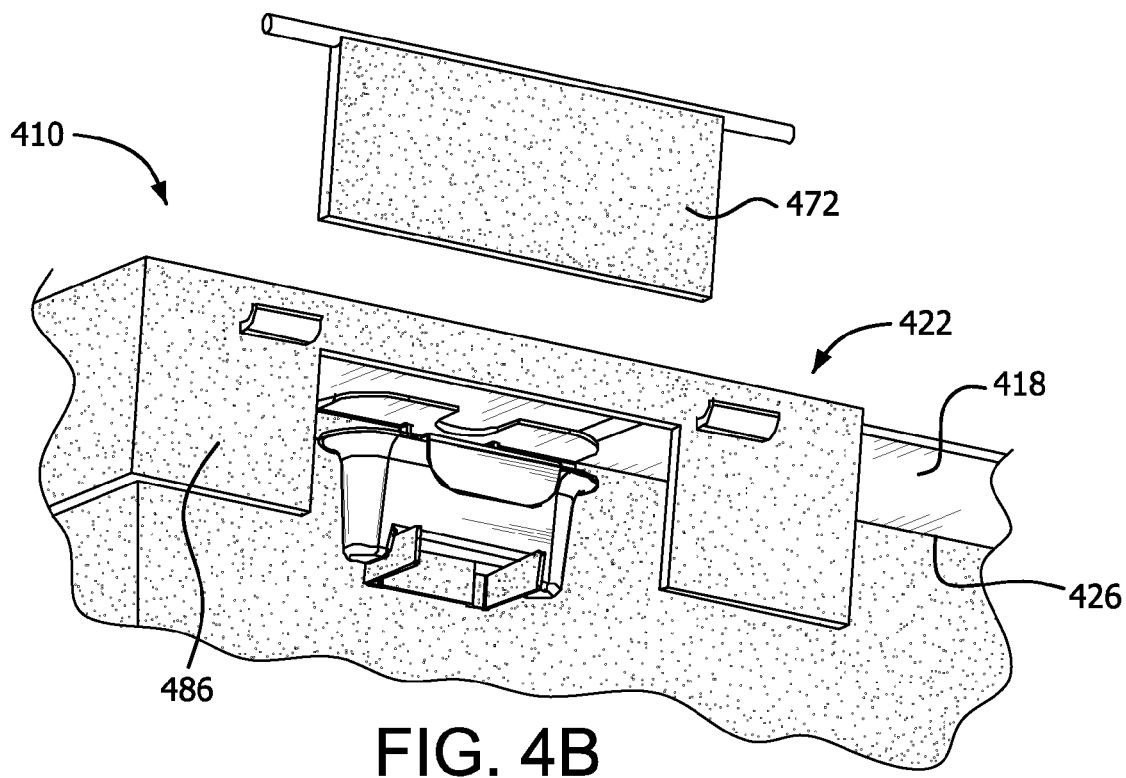
FIG. 4B is a enlarged view of a corner portion of the pest control system shown in FIG. 4A.

FIGS. 4A and 4B illustrate a further embodiment of a pest control system according to the invention, identified generally by reference numeral 410. System 410 is designed for uses as a continuous barrier between bedding structures such as a mattress 482 and an underlying box frame 484. System 410 is a capping system that fits over and is preferably secured to the perimeter of the box frame 484 such as by adhesives, screws or the like. System 410 comprises a set of pest control means 422 including at least one pest control means provided at a corner (preferably a plurality of corners) of the box frame which is or are connected by elongate guide surfaces 418. Together with the walls of the box frame 484, guide surfaces 418 define transition lines 426 along which bed bugs are guided to the pest control means 422. In particular, the undersides of the guide surface 418 are flat and smooth downwardly facing surfaces which define transition lines 426 at the interfaces of the guide surfaces and the textured box frame walls. Together, pest control means 422 and guide surfaces 418 form a barrier past which pests such as bed bugs cannot travel upwardly and infest the overlying mattress 482. Guide surfaces 418 may be of any of the types described above including, without limitation, adhesive tape and flexible to rigid plastic strips. Pest control means 422 includes a housing 486 that contains any suitable pest control or treatment structure heretofore or hereafter described. Each housing preferably includes a pivoting door 472 for aesthetic purposes.

In addition to or in lieu of a pitfall, the trapping means according to the present invention can be glue located adjacent suitable intercept wall(s). The glue may be provided on either the substrate or a structural component of the pest control means such as a member that is permanently or removably attached to the substrate adjacent the intercept wall(s).

It is further contemplated that the pest control means of the invention may include a pest treatment zone, which zone may be a dedicated element permanently or removably connected to a pest control means support structure such as a bracket in the manner described above. By way of example but not limitation, the treatment zone may comprise the upper surface of upper flange 44 of receptacle 28. As noted above, the treatment zone is preferably coated with a liquid or powder pesticide that may kill pests upon contact or may have a delayed reaction whereby the pests may carry residual pesticide to their nests whereby additional pests may become poisoned and eventually die because of their interaction with the treated pests. In this way, much less pesticide may be used than in conventional pesticide treatment applications. Consequently, the cost of treatment is reduced while treatment safety is improved.

Although the invention has been described in detail for the purpose of illustration, it is to be understood that such detail is solely for that purpose and that variations can be made therein by those skilled in the art without departing from the spirit and scope of the invention as claimed herein.

What is claimed is:

1. A pest control system comprising:
a substantially smooth guide surface for impeding movement of crawling pests and having a transition line defining an edge;
an intercept wall intersecting the transition line about a midpoint of a trap for intercepting movement of crawling pests, wherein the intercept wall extends from the substantially smooth guide surface and into an interior of the trap; and
a substantially horizontal flange extending between the guide surface and the trap, the intercept wall contacting and extending upwardly from both the flange and a convex surface extending into an interior of the trap.

2. A pest control system comprising: a substantially smooth and substantially vertical guide surface extending completely across a side of a trap for impeding movement of crawling pests and having an edge along which crawling pests are caused to travel over a textured surface; at least one substantially vertical intercept wall abutting said guide surface and extending substantially perpendicular to said guide surface for intercepting movement of crawling pests along said edge for redirecting their movement into the trap; wherein the trap is in communication with said at least one intercept wall for receiving crawling pests whose movement is intercepted and redirected by said at least one intercept wall, the intercept wall extending from the guide surface into an interior of the trap; and a substantially horizontal flange extending between the guide surface and the trap, the intercept wall contacting and extending upwardly from both the flange and a convex surface extending into an interior of the trap.

3. The system of claim 2 wherein said guide surface is a tape surface.

4. The system of claim 2 wherein said guide surface is connected to said at least one intercept wall.

5. The system of claim 2 wherein said guide surface is separate from said at least one intercept wall.

6. The system of claim 2 wherein said trap includes a pesticide treatment zone.

7. The system of claim 6 wherein said pesticide treatment zone is located substantially adjacent to said at least one intercept wall.

8. The system of claim 7 wherein said pesticide treatment zone is connected to said at least one intercept wall.

9. The system of claim 7 wherein said pesticide treatment zone is removably connectable adjacent said at least one intercept wall.

10. The system of claim 2 wherein said trap is connected to said at least one intercept wall.

11. The system of claim 2 wherein said trap is removably connectable adjacent said at least one intercept wall.

12. The system of claim 2 wherein said trap comprises glue.

13. The system of claim 2 wherein said trap comprises a pitfall.

14. The system of claim 13 wherein said pitfall comprises a receptacle.

15. The system of claim 14 wherein said receptacle has an open top and a closed bottom.

16. The system of claim 10 wherein said receptacle further comprises side walls joining said at least one convex surface to said bottom.

17. The system of claim 16 wherein said side walls are substantially vertical.

18. The system of claim 16 wherein said side walls are substantially smooth.

19. The system of claim 10 wherein said at least one convex surface is substantially smooth.

20. The system of claim 14 further comprising a bracket for removably supporting said receptacle.

21. The system of claim 20 wherein said bracket is releasably affixed to a substrate.

22. The system of claim 2 further comprising a bracket for removably supporting said trap.

23. The system of claim 22 wherein said bracket is releasably affixed to a substrate.

24. The system of claim 2 wherein said trap is connected to said at least one intercept wall.

25. The system of claim 2 wherein said trap is separate from said at least one intercept wall.

26. The system of claim 2 further comprising a base including said trap, said base being constructed to receive a bed leg or a box frame.

27. The system of claim 2 wherein said trap is constructed to reside atop a bed frame and communicate with at least one of said guide surface and said at least one intercept wall.

28. The system of claim 27 wherein said trap comprises a pesticide treatment zone.

29. A pest control system comprising:
a trap;
a substantially smooth guide surface having a transition line defining an edge along which crawling pests are caused to travel;
at least one intercept wall extending from the substantially smooth guide surface and into an interior of the trap; and
a substantially horizontal flange extending between the guide surface and the trap, the intercept wall contacting and extending upwardly from both the flange and a convex surface extending into an interior of the trap.

* * * * *